United States Patent [19]

Nashida et al.

[11] Patent Number: 5,343,019
[45] Date of Patent: Aug. 30, 1994

[54] IMAGE FORMING APPARATUS COPING WITH POWER SUPPLY VOLTAGE DRIFT

[75] Inventors: Yasumasa Nashida, Kawasaki; Toshio Yoshimoto; Yasuhiro Nakata, both of Yokohama, all of Japan

[73] Assignee: Canon Kabushiki Kaisha, Tokyo, Japan

[21] Appl. No.: 22,169

[22] Filed: Feb. 25, 1993

[30] Foreign Application Priority Data

Feb. 28, 1992 [JP] Japan .................. 4-075877

[51] Int. Cl.⁵ .................. H05B 1/02; G03G 15/20
[52] U.S. Cl. .................. 219/216; 355/285
[58] Field of Search .................. 219/216, 269–270, 219/497; 492/46; 355/210, 285

[56] References Cited

U.S. PATENT DOCUMENTS

| | | | |
|---|---|---|---|
| 3,532,855 | 10/1970 | Van Cleave | 219/471 |
| 3,840,797 | 10/1974 | Aggen et al. | 321/19 |
| 4,109,134 | 8/1978 | Van Herten | 219/216 |
| 4,162,379 | 7/1979 | Sebeus et al. | 219/497 |
| 4,180,721 | 12/1979 | Watanabe et al. | 219/216 |
| 4,618,242 | 10/1986 | Yamagishi | 219/216 |
| 4,868,729 | 9/1989 | Suzuki | 363/21 |
| 4,894,520 | 1/1990 | Moran | 219/497 |
| 5,179,263 | 1/1993 | Koh et al. | 219/216 |
| 5,229,577 | 7/1993 | Matsuura et al. | 219/497 |
| 5,276,482 | 1/1994 | Nakanishi | 355/285 |

Primary Examiner—Bruce A. Reynolds
Assistant Examiner—John A. Jeffery
Attorney, Agent, or Firm—Fitpatrick, Cella, Harper & Scinto

[57] ABSTRACT

An image forming apparatus includes a fixing heater driven by a voltage supplied from a commercial power supply, a transformer for transforming the voltage supplied from the commercial power supply into a predetermined voltage, and supplying the predetermined voltage to a load in the apparatus, and a controller for detecting the voltage transformed by the transformer, and controlling energization to the fixing heater.

5 Claims, 8 Drawing Sheets

FIG. 5

| TEMPERATURE / TABLE | T < Th | T > Th |
|---|---|---|
| TABLE 0 | 100% | 50% |
| TABLE 1 | 90% | 40% |
| TABLE 2 | 80% | 30% |
| TABLE 3 | 70% | 20% |
| TABLE 4 | 60% | 10% |

IMAGE FORMING APPARATUS COPING WITH POWER SUPPLY VOLTAGE DRIFT

BACKGROUND OF THE INVENTION

1. Field of the Invention

The present invention relates to an image forming apparatus such as a copying machine, a printer, or the like and, more particularly, to an image forming apparatus having a heat fixing means.

2. Related Background Art

In a conventional image forming apparatus having a heating fixing means, a halogen heater, a ceramic heater, or the like is energized by a commercial power supply.

Energization to the heater is controlled, so that the temperature of a heating member such as a heat roller is maintained a predetermined fixing temperature.

However, when the voltage output from the commercial power supply drifts due to a power supply circumstance of the place of use of the image forming apparatus, the heat generation amount of the heater is changed, and the heating member cannot be accurately temperature-controlled, thus adversely affecting image quality. In particular, since the ceramic heater is a pure resistor, its electric power changes according to the square of the input voltage. Furthermore, in an apparatus, which employs a heating member having a small heat capacity to meet a requirement for shortening the image formation time, the temperature gradient tends to increase, and a change in temperature caused by the voltage drift is increased.

In order to prevent the change in temperature caused by the power supply voltage drift, a circuit 802 for detecting a power supply voltage may be connected to a power supply circuit 801 so as to detect an input voltage.

However, this circuit requires a special-purpose transformer 803 for detecting a voltage, resulting in an increase in apparatus size.

SUMMARY OF THE INVENTION

It is an object of the present invention to provide an image forming apparatus capable of controlling a heating member at a constant temperature even when the power supply voltage drifts.

It is another object of the present invention to provide an image forming apparatus, capable of detecting an input voltage without use of a special-purpose transformer.

It is still another object of the present invention to provide an image forming apparatus, which comprises a fixing heater driven by a voltage output from a commercial power supply, a transformer for transforming the voltage output from the commercial power supply into a predetermined voltage, a circuit for supplying the transformed voltage to a load in the apparatus, and control means for detecting the voltage transformed by the transformer, and controlling energization to the fixing heater.

Other objects of the present invention will become apparent from the following description.

BRIEF DESCRIPTION OF THE DRAWINGS

FIG. 5 is a table used in an embodiment of the present invention;

DESCRIPTION OF THE PREFERRED EMBODIMENTS

The preferred embodiments of the present invention will be described hereinafter.

Figure 1:
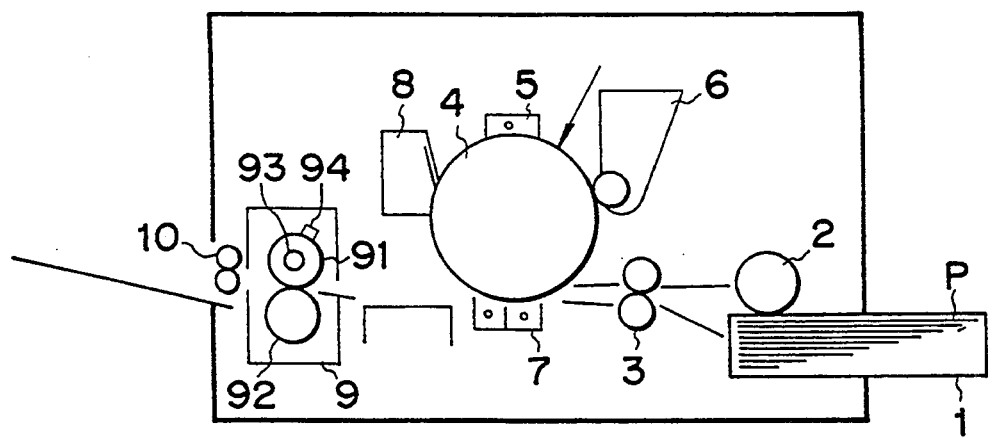
FIG. 1 is a sectional view showing a principal part of an image forming apparatus according to an embodiment of the present invention.

FIG. 1 is a sectional view showing a principal part of an image forming apparatus according to an embodiment of the present invention.

Referring to FIG. 1, a paper feed cassette 1 stores recording media P, and is arranged to partially project from the right-hand side of the apparatus. A paper feed roller 2 is arranged above the paper feed cassette 1, and conveys the recording medium P toward register rollers 3 arranged at the forward side in the recording medium convey direction, of the paper feed roller 2. A photosensitive drum 4 as a latent image carrier is arranged at the forward side in the recording medium convey direction, of the register rollers 3. The register rollers 3 convey the recording medium P to the photosensitive drum 4 in synchronism with an image forming operation on the photosensitive drum 4.

A primary charger 5, a developing device 6, a transfer charger 7, and a cleaning device 8 are arranged around the photosensitive drum 4, and perform formation of a toner image on the surface of the photosensitive drum 4, transfer of the toner image onto the recording medium P, and cleaning of the surface of the drum 4. More specifically, upon radiation of a laser beam onto the surface of the photosensitive drum 4, which surface is uniformly charged by the primary charger 5, a latent image corresponding to an original image is formed on the drum surface, and is visualized by the developing device. The visualized image (toner image) is transferred by the transfer charger 7 onto the recording medium P conveyed from the register rollers 3, and is carried on the recording medium P. After the transfer processing, the surface of the photosensitive drum 4 is cleaned by the cleaning device 8 to prepare for the next latent image formation processing.

The recording medium P, on which the visualized image has been transferred, as described above, is conveyed toward a fixing device 9 arranged at the forward side in the recording medium convey direction, of the photosensitive drum 4, and the visualized image on the recording medium P is fixed as a permanent image by the fixing device 9. Exhaust rollers 10 are arranged at the downstream side of the recording medium convey direction, of the fixing device 9, and exhaust the recording medium P after the fixing processing outside the image forming apparatus.

The fixing device 9 comprises a heat roller 91 including a halogen heater 93, and a compression roller 92 for forming a nip together with the heat roller 91, and fixes the toner image by clamping and conveying the recording medium in the nip.

A thermistor 94 detects the surface temperature of the heat roller. Energization to the halogen heater 93 is controlled, so that the detected temperature of the thermistor is maintained at a predetermined fixing temperature.

Figure 2:
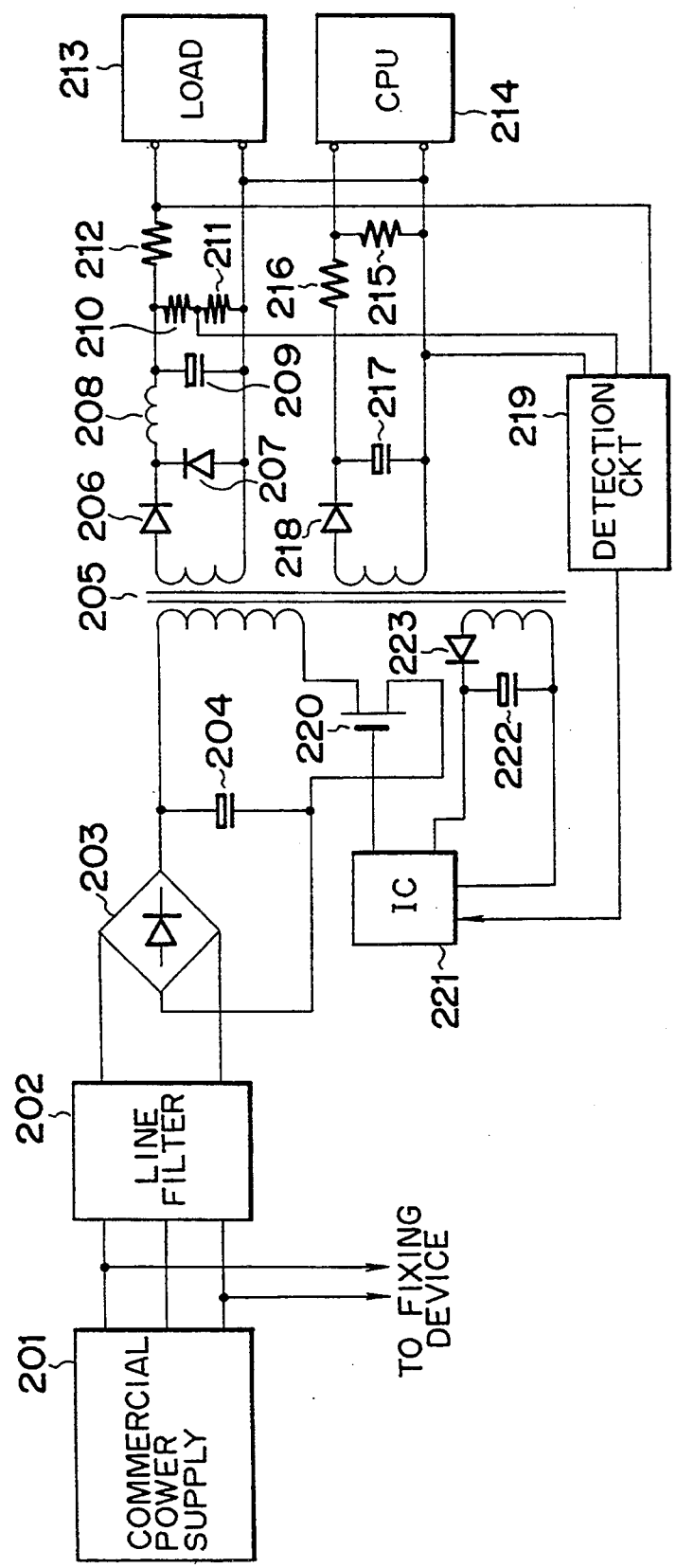
FIG. 2 is a circuit diagram showing a circuit used in the embodiment of the present invention.

FIG. 2 is a circuit diagram showing a circuit used in this embodiment.

Referring to FIG. 2, a commercial power supply 201 supplies a voltage, which is converted into a DC voltage by this power supply circuit to drive a load (e.g., an actuator such as a motor, a semiconductor element such as a CPU, and the like) 213, and is connected to a driving circuit (not shown) for the halogen heater of the fixing device 9 as an AC power supply.

A voltage supplied from the commercial power supply 201 is input to and rectified by a diode bridge 203 via a line filter 202. Thereafter, the voltage is smoothed by an AC voltage smoothing capacitor 204, and the smoothed voltage is input to the primary side of a transformer 205 as a transforming means. The voltage transformed by the transformer 205 into a predetermined voltage value is supplied to a DC rectifying/smoothing circuit, and is also supplied from the secondary side of the shunt-wound transformer 205 to a commercial power supply voltage detection circuit.

The DC rectifying/smoothing circuit is constituted by switching diodes 206 and 207, a choke coil 208, and a DC smoothing capacitor 209. With this circuit, the input voltage is rectified and smoothed, and is supplied to the load 213 as a stable DC voltage. The rectifying/smoothing circuit is connected to voltage-dividing resistors 210 and 211 for detecting an overvoltage, and a detection resistor 212 for detecting an overcurrent. The overvoltage and overcurrent detection signals are input to a detection circuit 219, and the overvoltage or overcurrent detection state is fed back to a switching circuit to be described below.

The switching circuit is constituted by a switching power MOSFET 220 connected so as to switch the rectified and smoothed AC voltage to be input to the transformer 205, an IC 221 as a switching regulator for switching the driving mode of the FET 220, and a power supply for the IC 221, constituted by a capacitor 222 and a diode 223. The switching circuit is connected to the detection circuit 219. Thus, the switching circuit controls a voltage to be input to the primary side of the transformer on the basis of the secondary-side DC voltage/current state fed back from the detection circuit 219, thereby stabilizing the secondary-side DC voltage/current.

The commercial power supply voltage detection circuit holds a peak value of the detected voltage by a switching diode 218 and a capacitor 217. The held peak value is converted by voltage-dividing resistors 215 and 216 into a voltage having an input level to a CPU 214, and the converted voltage is input to the input terminal of the CPU 214. Although not shown, the output from the thermistor 94 is supplied to the CPU 214.

Thus, the CPU 214 controls an energization power according to a change in commercial power supply voltage, and ON/OFF-controls energization by comparing the detected output from the thermistor 94 with a predetermined value.

In this embodiment, the input voltage of the commercial power supply is detected using the transformer 205 for a constant voltage power supply, and driving control of the electrical heat generating member is executed according to the input voltage drift. Therefore, even when the commercial power supply voltage drifts due to a power supply circumstance of a use place of the image forming apparatus, the electrical heat generating member can be appropriately controlled, so that the surface temperature of the fixing roller is maintained at a desired temperature. Furthermore, since the voltage is detected using the power supply transformer 205 without arranging another commercial power supply voltage detection transformer, the circuit arrangement can be simplified, thus preventing an increase in apparatus size, and an increase in cost.

By the way, when the voltage value is detected by the secondary coil provided to the transformer for transforming a commercial power supply voltage to supply a voltage to a load, if the used current of the load 213 changes, the voltage detected by the voltage detection circuit undesirably changes accordingly. This problem will be discussed below with reference to FIG. 3.

Figure 3:
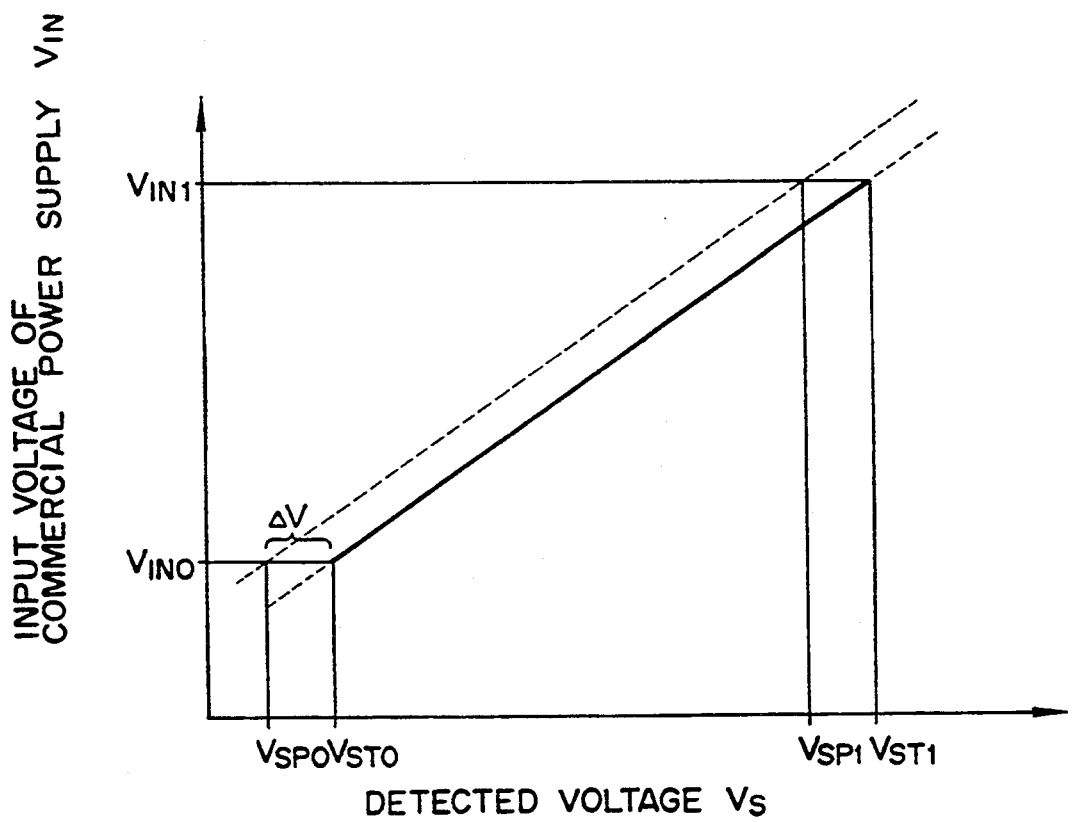
FIG. 3 is a graph showing the relationship between the input voltage and the detected voltage in the circuit shown in FIG. 2.

FIG. 3 is a graph showing the relationship of a detected voltage $V_S$ detected by the CPU 214 in the voltage detection circuit with respect to an input voltage $V_{IN}$ from the commercial power supply to the power supply circuit. The abscissa is for detected voltage $V_S$, and the ordinate is for input voltage $V_{IN}$. In FIG. 3, a solid line represents input voltage-detected voltage characteristics during a standby state (in the lightest load state without image formation), and a dotted line represents input voltage-detected voltage characteristics during a print state (during image formation).

For example, if the input voltage $V_{IN}$ from the commercial power supply has a value $V_{IN0}$, the detected voltage during the standby state has a value $V_{ST0}$, but has a value $V_{SP0}$ lower than $V_{ST0}$ during the print state. When the input voltage $V_{IN}$ has a value $V_{IN1}$, detected voltage values $V_{ST1}$ and $V_{SP1}$ during the standby and print states have a relation $(V_{ST1} > V_{SP1})$ therebetween. This is because the used current of the load 213 varies between the standby and print states, and the detected voltage undesirably changes in correspondence with a difference in used current.

In order to solve this problem, the detected voltage during the print state may be corrected. However, since the used current of the load largely varies among image forming apparatuses, the detected voltage cannot be uniquely corrected by a fixed value. Thus, this embodiment pays attention to the facts that the characteristic lines during the standby and print states have an equal inclination, and that the following relation is satisfied in each image forming apparatus:

$$V_{SP1} - V_{ST1} = V_{SP0} - V_{ST0}$$

Then, a difference between the detected voltages during the standby and print states is calculated in each image forming apparatus, and the detected voltage value during the print state is converted into that during the standby state on the basis of the calculated difference. Even when the used current of the load varies among image forming apparatuses, and a difference between the detected voltages during the standby and print states also varies, the electrical heat generating member can be accurately and delicately controlled according to the voltage drift of the commercial power supply without being adversely affected by a variation in used current of the load in each image forming apparatus.

Figure 4:
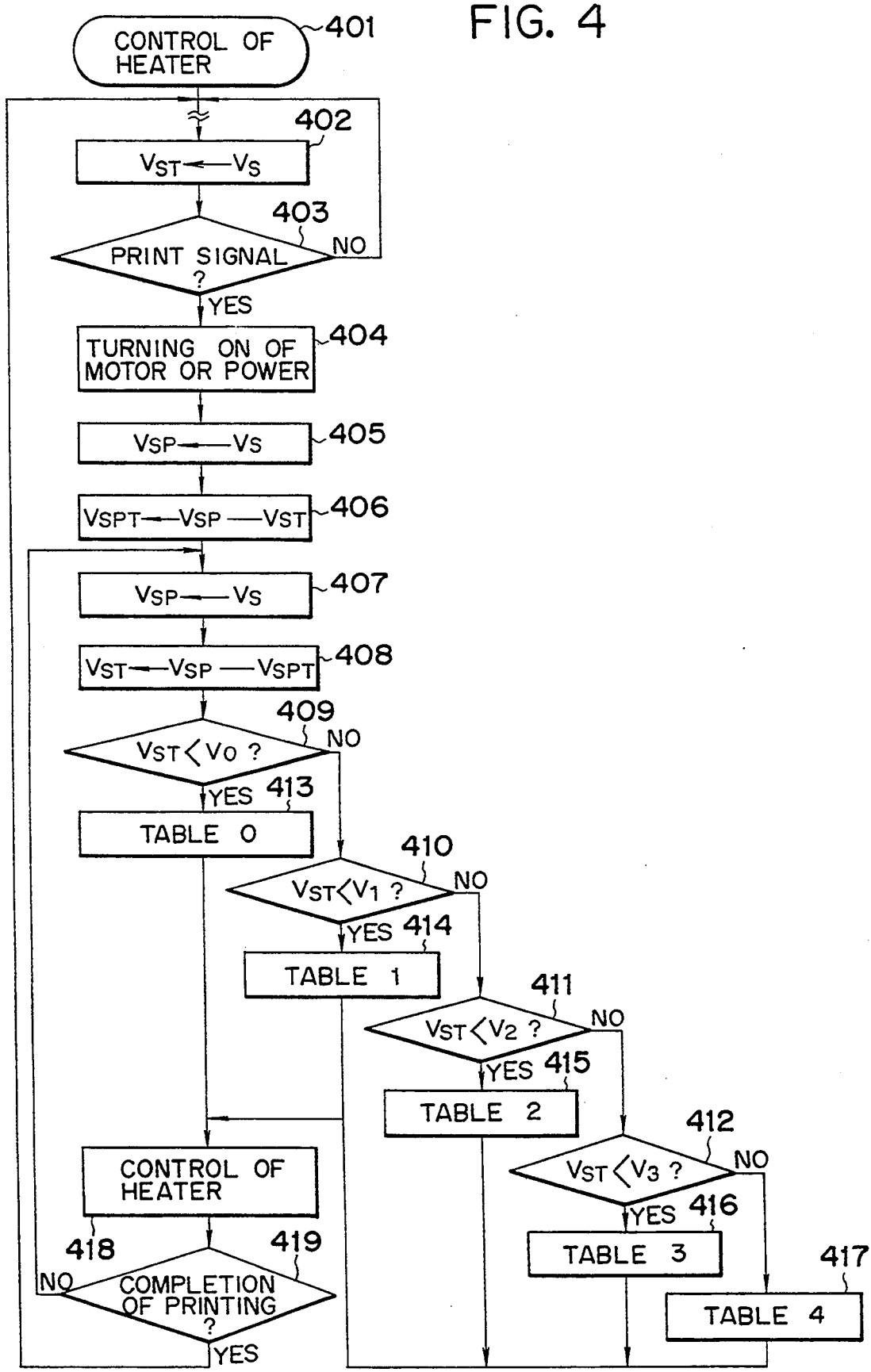
FIG. 4 is a flow chart showing an operation according to an embodiment of the present invention.

A control method of this embodiment will be described below with reference to FIG. 4. FIG. 4 is a flow chart showing a control method of the electrical heat generating member in the CPU 214.

The CPU 214 stores a detected voltage $V_S$ during the standby state in a memory area $V_{ST}$ (the area $V_{ST}$ corresponds to a RAM area specified by a symbol "$V_{ST}$" in a RAM (not shown) separated from or integrated with the CPU 214; the same applies to the following memory areas) (step 402). Thereafter, the CPU 214 always monitors an input print signal. When a print signal is input, the CPU 214 stores a detected voltage $V_S$ in a heavy load state in a memory area $V_{SP}$ (step 405). Then, the CPU 214 stores the difference between the contents of the memory areas $V_{SP}$ and $V_{ST}$ in a memory area $V_{SPT}$ (step 406). This difference corresponds to $\Delta V$ in FIG. 3. Therefore, the CPU 214 stores a voltage $V_S$ input during the print state in the memory area $V_{SP}$ (step 407), and subtracts the content of the memory area $V_{SPT}$ from the content of the memory area $V_{SP}$ (step 408), thereby correcting a change between the characteristic lines in the print and standby states. In other words, the detected voltage $V_S$ during the print state is converted into the detected voltage $V_S$ during the standby state. Meanwhile, Gables for determining a duty of a voltage to be supplied to the electrical heat generating member are allocated on the RAM or a ROM. An optimal table for an AC input voltage at that time is selected based on the converted detected voltage $V_S$ (steps 409 to 417), and temperature control is performed with reference to the selected table (steps 418 and 419).

The tables mentioned in the description of FIG. 4 will be explained below with reference to FIG. 5. Five different tables are prepared, and each table is set with duty cycles of a voltage to be supplied to the electrical heat generating member in correspondence with the surface temperatures of the fixing roller lower and higher than a reference temperature. The duty cycle means the ratio of the energization time for the electrical heat generating member to one period of the frequency of the AC voltage. For example, "100%" shown in table 0 in FIG. 5 indicates an energization state executed for the entire period, and "50%" indicates an energization state executed for a half period. The tables are prepared stepwise in correspondence with the AC input voltage from a commercial power supply, and are set to have smaller duty values as the AC input voltage becomes higher. In FIG. 5, T is the temperature detected by a temperature sensor arranged near the electrical heat generating member, and Th is the temperature necessary for thermally fixing a non-fixed toner.

For example, when table 2 is selected in the flow chart of FIG. 4, the CPU 214 as the temperature control means stores duty values "80%" and "30%". If it is determined in step 418 in the flow chart of FIG. 4 that the temperature T detected by the temperature sensor is lower than the temperature Th, the CPU 214 energizes the electrical heat generating member at 80%; otherwise, it energizes the member at 30%. In this embodiment, five tables 0 to 4 are prepared. However, the number of tables may be increased.

As described above, according to this embodiment, since the voltage from the commercial power supply is detected by utilizing the transformer of the power supply circuit, even when the voltage drifts due to a power supply circumstance of a use place of the image forming apparatus, the electrical heat generating member of the fixing roller can be appropriately controlled, and cost can also be reduced. Since the detected voltage drift caused by a change in used current of the load is corrected on the basis of the correlation between detected voltages in the standby and print states, the above-mentioned apparatus can be provided without lowering its detection precision.

Another embodiment of the present invention will be described below.

Figure 6:
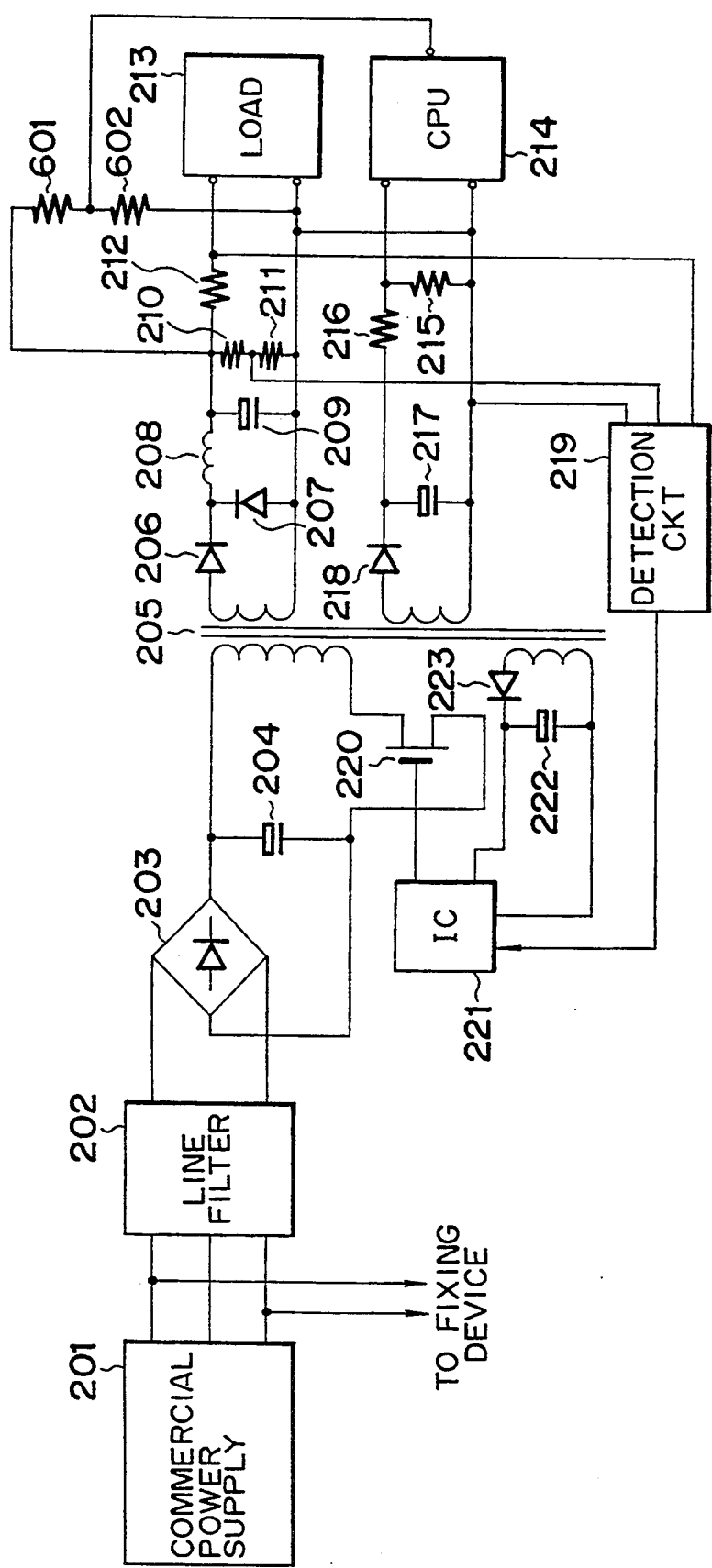
FIG. 6 is a circuit diagram showing another embodiment of the present invention.

FIG. 6 is a circuit diagram showing a circuit used in this embodiment.

This embodiment is substantially the same as the first embodiment, except that the used current of the load 213 is monitored by the CPU 214 to correct a corresponding detected voltage drift. Therefore, the circuit of this embodiment comprises voltage-dividing resistors 601 and 602 for detecting the used current.

Figure 7:
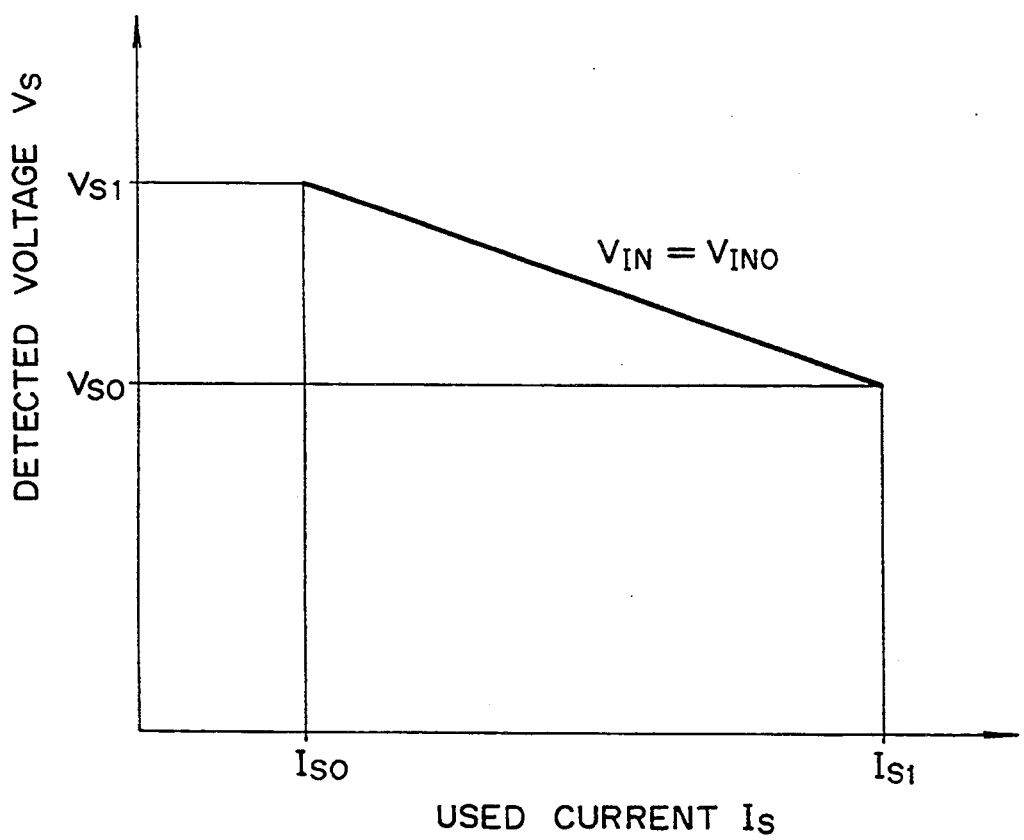
FIG. 7 is a graph showing the relationship between the detected voltage and the used current.

The detected voltage tends to decrease as the used current of the load 213 is increased, as shown in FIG. 7. Therefore, when characteristics of a detected voltage $V_S$ with respect to a used current $I_S$ shown in FIG. 7 are stored as tables in addition to characteristics obtained when an input voltage $V_{IN}$ has a value $V_{IN0}$ shown in FIG. 7, an input voltage can be estimated on the basis of the used current detected by the CPU 214 and the detected voltage.

According to this embodiment, since a detected voltage drift with respect to a change in load current in a standby state can be corrected as well, an input voltage can be detected more accurately than in the first embodiment in consideration of a variation in load current in the standby state among image forming apparatuses.

The present invention has been described with reference to its embodiments. .However, the present invention is not limited to these embodiments, and various modifications may be made within the spirit and scope of the invention.

What is claimed is:

1. An image forming apparatus comprising:
   image forming means for forming an unfixed image on a record medium;
   fixing means for heating and fixing the unfixed image on the record medium, said fixing means including a fixing heater driven by a voltage supplied from a commercial power supply;
   alternating to direct current converting means for converting an alternating voltage from the commercial power supply into direct voltage of a predetermined value, said alternating to direct current converting means including a transformer for transforming the voltage from the commercial power supply into the direct voltage;
   a semiconductor element driven by the direct voltage converted by said alternating to direct current converting means; and
   digital control means for detecting the voltage transformed by said transformer to control energization to said fixing heater.

2. An apparatus according to claim 1, wherein the secondary winding of said transformer comprises a main coil for supplying the voltage to a load in said apparatus, and an auxiliary coil for detecting the voltage.

3. An apparatus according to claim 1, further comprising a heating member heated by said fixing heater, and a temperature detection member for detecting a temperature of said heating member, wherein said digital control means controls energization on the basis of a detection output from said temperature detection member.

4. An apparatus according to claim 1, wherein said control means comprises calculation means for controlling voltage on the basis of a used current of the load.

5. An apparatus according to claim 1, wherein said control means comprises a table for controlling voltage on the basis of a used current of the load.

* * * * *

UNITED STATES PATENT AND TRADEMARK OFFICE
CERTIFICATE OF CORRECTION

PATENT NO. : 5,343,019
DATED : August 30, 1994
INVENTOR(S) : YASUMASA NASHIDA, ET AL.

Figure 8:
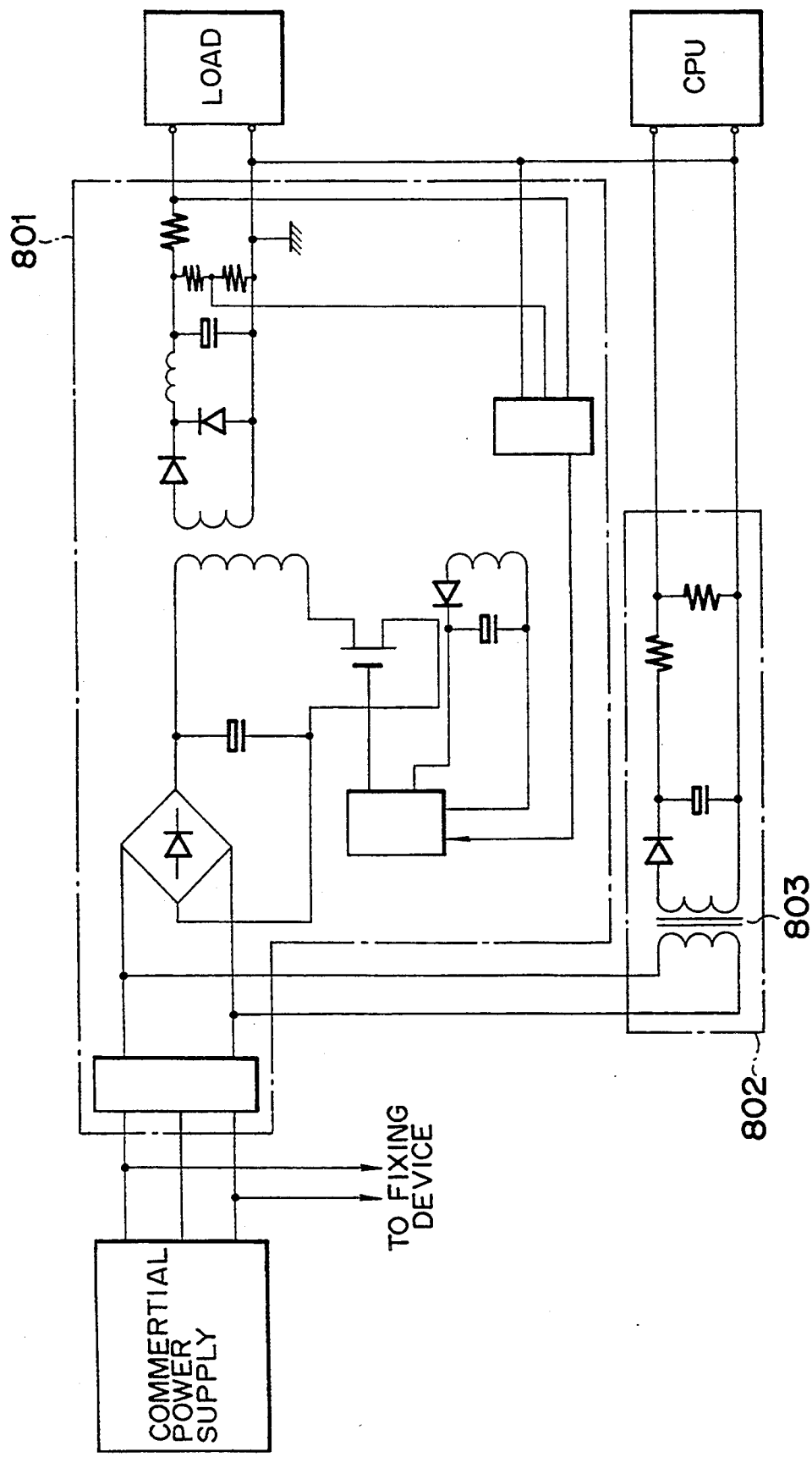
FIG. 8 is a circuit diagram as a background of the present invention.

It is certified that error appears in the above-indentified patent and that said Letters Patent is hereby corrected as shown below:

<u>Figure 8</u>,
    "COMMERTIAL" should read --COMMERCIAL--.

<u>Column 1</u>,
    Line 18, "a" should read --at a--; and
    Line 66, "a" (second occurrence) should read --the--.

<u>Column 2</u>,
    Line 2, "the" (first occurrence) should read --an--.

<u>Column 5</u>,
    Line 27, "Gables" should read --tables--.

Signed and Sealed this

Tenth Day of January, 1995

BRUCE LEHMAN

*Attest:*

*Attesting Officer*  *Commissioner of Patents and Trademarks*